United States Patent [19]

Agano

[11] Patent Number: 5,072,117
[45] Date of Patent: Dec. 10, 1991

[54] RADIATION IMAGE READ-OUT APPARATUS

[75] Inventor: Toshitaka Agano, Kanagawa, Japan

[73] Assignee: Fuji Photo Film Co., Ltd., Kanagawa, Japan

[21] Appl. No.: 640,450

[22] Filed: Jan. 11, 1991

[30] Foreign Application Priority Data

Jan. 12, 1990 [JP] Japan .................................. 2-5421

[51] Int. Cl.$^5$ .................................................. G03C 5/16
[52] U.S. Cl. .................................. 250/327.2; 250/347
[58] Field of Search ................... 250/484.1, 327.2, 347

[56] References Cited

U.S. PATENT DOCUMENTS 4,258,264  3/1981  Kotera et al. ................... 250/484.1
4,748,326  5/1988  Mori et al. ...................... 250/484.1
4,894,540  1/1990  Komatsu ........................... 250/307

FOREIGN PATENT DOCUMENTS 56-11395  2/1981  Japan .

Primary Examiner—Carolyn E. Fields
Assistant Examiner—James E. Beyer
Attorney, Agent, or Firm—Sughrue, Mion, Zinn, Macpeak & Seas

[57] ABSTRACT

In a radiation image read-out apparatus, a stimulable phosphor sheet, on which a radiation image has been stored, is scanned with a stimulating ray beam, which causes the stimulable phosphor sheet to emit light in proportion to the amount of energy stored thereon during its exposure to radiation. The light, which is emitted by part of the stimulable phosphor sheet being scanned with the stimulating ray beam, is photoelectrically detected and converted into an image signal. The beam diameter of the stimulating ray beam is adjusted such that it is larger than the size of each picture element in the radiation image. Each picture element is scanned with the stimulating ray beam by a plurality of scanning steps such that the position, which is scanned, is shifted for different scanning steps. A filtering device is provided, with which a single image signal component representing each picture element is generated from a plurality of image signal components, which are obtained during the plurality of scanning steps for each picture element.

5 Claims, 4 Drawing Sheets

RADIATION IMAGE READ-OUT APPARATUS

BACKGROUND OF THE INVENTION

1. Field of the Invention

This invention relates to a radiation image read-out apparatus for exposing a stimulable phosphor sheet, on which a radiation image has been stored, to stimulating rays, which cause the stimulable phosphor sheet to emit light in proportion to the amount of energy stored thereon during its exposure to radiation, photoelectrically detecting the emitted light, and thereby reading out the radiation image.

2. Description of the Prior Art

When certain kinds of phosphors are exposed to radiation such as X-rays, $\alpha$-rays, $\beta$-rays, $\gamma$-rays, cathode rays or ultraviolet rays, they store part of the energy of the radiation. Then, when the phosphor which has been exposed to the radiation is exposed to stimulating rays such as visible light, light is emitted by the phosphor in proportion to the amount of energy stored thereon during its exposure to the radiation. A phosphor exhibiting such properties is referred to as a stimulable phosphor.

As disclosed in U.S. Pat. No. 4,258,264 and Japanese Unexamined Patent Publication No. 56(1981)-11395, it has been proposed to use stimulable phosphors in radiation image recording and reproducing systems. Specifically, a sheet provided with a layer of the stimulable phosphor (hereinafter referred to as a stimulable phosphor sheet) is first exposed to radiation which has passed through an object, such as the human body. A radiation image of the object is thereby stored on the stimulable phosphor sheet. The stimulable phosphor sheet is then scanned with stimulating rays, such as a laser beam, which cause it to emit light in proportion to the amount of energy stored thereon during its exposure to the radiation. The light emitted by the stimulable phosphor sheet, upon stimulation thereof, is photoelectrically detected and converted into an electric image signal. The image signal is then used during the reproduction of the radiation image of the object as a visible image on a recording material such as photographic film, on a display device such as a cathode ray tube (CRT) display device, or the like.

In general, in radiation image recording and reproducing systems which use stimulable phosphor sheets, radiation images are read out with a read-out apparatus described below. Specifically, a beam of stimulating rays is deflected by a light deflector and caused to scan a stimulable phosphor sheet in a main scanning direction. Also, the stimulable phosphor sheet is moved in a subscanning direction, which is approximately normal to the main scanning direction.

As the light deflector, a rotating polygon mirror may be utilized. The rotating polygon mirror can carry out scanning more reliably than other types of light deflectors, such as galvanometer mirrors. However, for this purpose, the rotating polygon mirror must be rotated quickly. On the other hand, in order for a stimulable phosphor sheet to be stimulated, it must be exposed to stimulating rays having a comparatively high energy. However, when the rotating polygon mirror is rotated quickly, the speed, with which the stimulating ray beam scans the stimulable phosphor sheet in the main scanning direction, becomes high, so that the level of stimulation energy which the stimulable phosphor sheet receives becomes low. As a result, the intensity of light emitted by the stimulable phosphor sheet becomes low, and therefore the signal-to-noise ratio (S/N ratio) of an image signal thus obtained cannot be kept high.

In view of the above circumstances, in U.S. Pat. No. 4,748,326, the applicant proposed a radiation image read-out apparatus with which a read-out image signal having a high S/N ratio can be obtained even when a stimulable phosphor sheet is quickly scanned with a stimulating ray beam.

With the proposed radiation image read-out apparatus, a stimulable phosphor sheet, on which a radiation image has been stored, is scanned with a stimulating ray beam, which causes the stimulable phosphor sheet to emit light in proportion to the amount of energy stored thereon during its exposure to radiation, and the emitted light is photoelectrically detected. The beam diameter of the stimulating ray beam is adjusted such that it is smaller than the size of each picture element in the radiation image. Also, each picture element is divided into a plurality of portions, and each portion is scanned with the stimulating ray beam by a single scanning step. A plurality of image signal components, which are obtained during a plurality of scanning steps and represent a single picture element, are added by an addition means. An image signal component resulting from the addition is taken as a read-out image signal component representing a single picture element.

When the beam diameter of the stimulating ray beam is adjusted such that it is sufficiently small, a high level of stimulation energy can be obtained. Also, when different portions of a single picture element are scanned by different scanning steps, the amount of light emitted by a stimulable phosphor sheet per picture element can be kept sufficiently large. The read-out image signal component, which is obtained by adding a plurality of image signal components representing a plurality of portions of a single picture element, represents the total amount of light emitted by the stimulable phosphor sheet per picture element. Therefore, the read-out image signal component thus obtained has a high S/N ratio.

However, study carried out by the inventor revealed that the radiation image read-out apparatus proposed in U.S. Pat. No. 4,748,326 has the drawback in that the efficiency, with which stimulating rays are utilized, becomes low.

SUMMARY OF THE INVENTION

The primary object of the present invention is to provide a radiation image read-out apparatus, with which a read-out image signal having a high S/N ratio can be obtained even when a stimulable phosphor sheet is quickly scanned with a stimulating ray beam, and the efficiency, with which stimulating rays are utilized, can be kept high.

Another object of the present invention is to provide a radiation image read-out apparatus, which enables a visible radiation image having good image quality to be reproduced.

The present invention provides a radiation image read-out apparatus for scanning a stimulable phosphor sheet, on which a radiation image has been stored, with a stimulating ray beam, which causes the stimulable phosphor sheet to emit light in proportion to the amount of energy stored thereon during its exposure to radiation, and photoelectrically detecting the light, which is emitted by part of the stimulable phosphor sheet being scanned with the stimulating ray beam, with a photodetector, an image signal being thereby generated, wherein the beam diameter of said stimulating ray beam is adjusted such that it is larger than the size of each picture element in said radiation image, each picture element is scanned with said stimulating ray beam by a plurality of scanning steps such that the position, which is scanned, is shifted for different scanning steps, and a filtering means is provided, with which a single image signal component representing each picture element is generated from a plurality of image signal components, which are obtained during the plurality of said scanning steps for each said picture element.

FIG. 4 is a graph showing the relationship between the ratio of the beam diameter of a stimulating ray beam to the size of each picture element and the relative value of the detective quantum efficiency (DQE) of a radiation image read-out apparatus. As illustrated in FIG. 4, the DQE becomes larger as the ratio of the beam diameter of a stimulating ray beam to the size of each picture element is higher. Therefore, with the radiation image read-out apparatus in accordance with the present invention, the efficiency, with which stimulating rays are utilized, can be kept higher than that achieved with the radiation image read-out apparatus, which is proposed in U.S. Pat. No. 4,748,326 and in which the beam diameter of a stimulating ray beam is adjusted such that it is smaller than the size of each picture element.

With the radiation image read-out apparatus in accordance with the present invention, each picture element is scanned with the stimulating ray beam by a plurality of scanning steps such that the position, which is scanned, is shifted for different scanning steps. Therefore, the amount of light emitted by the stimulable phosphor sheet per picture element in the radiation image stored on the stimulable phosphor sheet can be kept sufficiently large, and a sufficiently high level of read-out image signal can be obtained. From the high level of read-out image signal generated by the radiation image read-out apparatus in accordance with the present invention, a visible image can be reproduced which has good image quality and a high S/N ratio.

Also, with the radiation image read-out apparatus in accordance with the present invention, the beam diameter of the stimulating ray beam is adjusted such that it is larger than the size of each picture element in the radiation image. Therefore, the efficiency, with which stimulating rays are utilized, can be kept high.

DESCRIPTION OF THE PREFERRED EMBODIMENTS

The present invention will hereinbelow be described in further detail with reference to the accompanying drawings.

Figure 1:
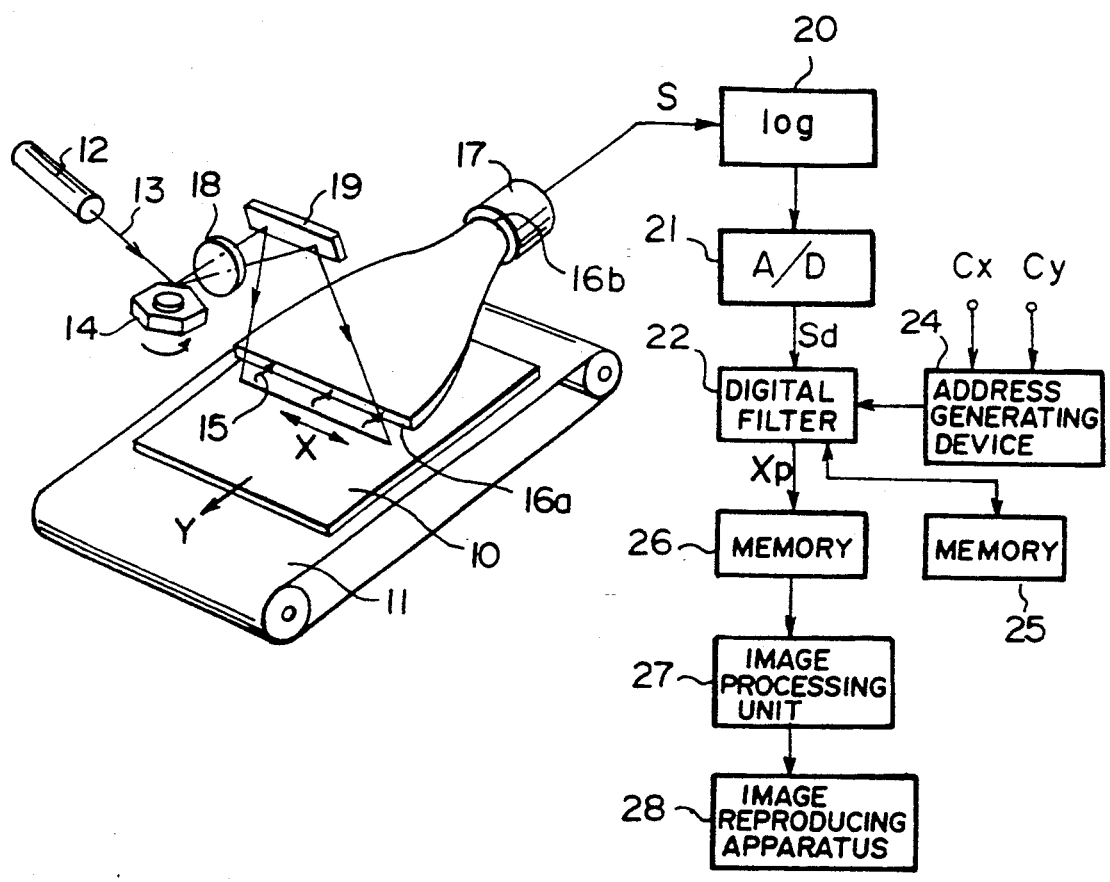
FIG. 1 is a schematic view showing an embodiment of the radiation image read-out apparatus in accordance with the present invention.

FIG. 1 is a schematic view showing an embodiment of the radiation image read-out apparatus in accordance with the present invention. A stimulable phosphor sheet 10 has been exposed to radiation, such as X-rays, which has passed through an object. A radiation image of the object has thereby been stored on the stimulable phosphor sheet 10. The stimulable phosphor sheet 10, on which the radiation image has been stored, is then conveyed in a sub-scanning direction indicated by the arrow Y by a sheet conveyance means 11. The sheet conveyance means 11 may be constituted of an endless belt, or the like. A laser beam 13, which serves as stimulating rays, is produced by a laser beam source 12, and is deflected by a rotating polygon mirror 14 which is rotated quickly. The laser beam 13 is then converged by a converging lens 18, which is ordinarily constituted of an fθ lens. Thereafter, the laser beam 13 is reflected by a mirror 19, and is caused to scan the stimulable phosphor sheet 10 in main scanning directions indicated by the double headed arrow X, which directions are approximately normal to the sub-scanning direction indicated by the arrow Y.

When the stimulable phosphor sheet 10 is exposed to the laser beam 13, the exposed portion of the stimulable phosphor sheet 10 emits light 15 in an amount proportional to the amount of energy stored thereon during its exposure to the radiation. The emitted light 15 is guided by a light guide member 16 and photoelectrically detected by a photomultiplier 17, which serves as a photodetector The light guide member 16 is made from a light guiding material such as an acrylic plate and has a linerar light input face 16a, positioned so that it extends along the main scanning line on the stimulable phosphor sheet 10, and a ring-shaped light output face 16b, positioned so that it is in close contact with a light receiving face of the photomultiplier 17. The emitted light 15, which has entered the light guide member 16 at its light input face 16a, is guided through repeated total reflection inside of the light guide member 16, emanates from the light output face 16b, and is received by the photomultiplier 17. In this manner, the amount of the emitted light 15, which amount represents the radiation image, is converted into an electric signal by the photomultiplier 17.

In the manner described above, an analog output signal (image signal) S is generated by the photomultiplier 17. The analog output signal S is amplified by a logarithmic amplifier 20 and is then digitized into a digital image signal Sd with a predetermined scale factor in an A/D converter 21. The digital image signal Sd is fed into a digital filter 22, which carries out filtering processing on the digital image signal Sd. How filtering processing is carried out will be described hereinbelow.

Figure 2:
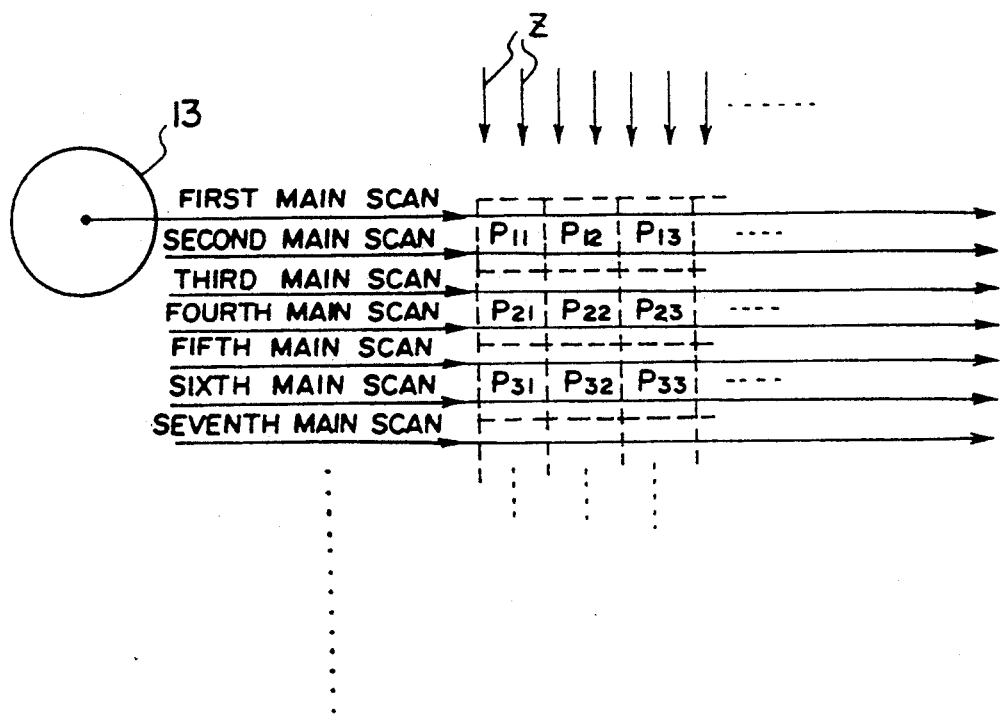
FIG. 2 is an explanatory view showing how each picture element is scanned with a stimulating ray beam by a plurality of scanning steps in the embodiment of FIG. 1.

As illustrated in FIG. 2, the laser beam 13 is converged such that its beam diameter is larger than the size of each picture element P on the stimulable phosphor sheet 10. In this embodiment, the beam diameter, d, of the laser beam 13 on the stimulable phosphor sheet 10 is adjusted such that it is two times as large as the length of one side of the picture element P. Because the main scanning with the laser beam 13 is carried out by utilizing the rotating polygon mirror 14, the stimulable phosphor sheet 10 is very quickly scanned with the laser beam 13 in the main scanning direction. Therefore, each picture element P is scanned several times with the laser beam 13. In this embodiment, the speed, with which the main scanning is carried out, and the speed, with which the sub-scanning is carried out, are adjusted appropriately such that the main scanning is carried out a predetermined number of times for the stimulable phosphor sheet 10, where the number is two times as large as the number of rows of the array of picture elements in the radiation image stored on the stimulable phosphor sheet 10. The rows of the array of picture elements stand one behind another along the sub-scanning direction. Specifically, two main scanning steps are carried out per row of the array of picture elements. Also, the A/D converter 21 samples the analog signal S with the timing such that signal components corresponding to positions indicated by the arrows Z, Z, . . . in FIG. 2 are sampled.

Figure 3:
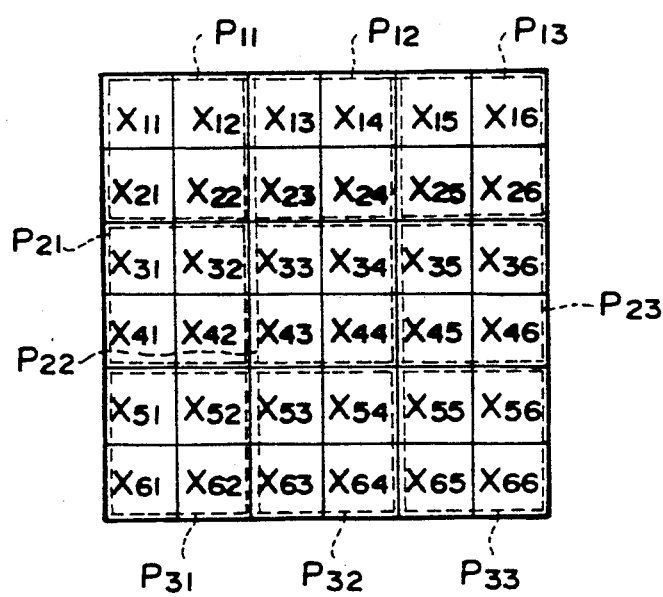
FIG. 3 is an explanatory view showing an example of how filtering processing is carried out on image signal components in the embodiment of FIG. 1.

Therefore, as illustrated in FIG. 3, the digital image signal Sd, which has been generated by the A/D converter 21, comprises four (=2×2) image signal components per picture element P. As a whole, the digital image signal Sd comprises 4J number of image signal componenets, where J represents the total number of picture elements in the radiation image stored on the stimulable phosphor sheet 10. In this embodiment, the digital filter 22 carries out filtering processing, with which the value of a final image signal component X representing each picture element P is calculated from the values of 36 (=4>9) image signal components representing the picture element P and eight surrounding picture elements. Specifically, as shown in FIG. 3, 36 image signal components representing nine picture elements (i.e. P11, P12, P13, P21, P22, P23, P31, P32, and P33) are represented by x11, x12, x13, ..., x65, and x66. In such cases, the digital filter 22 calculates the value of the image signal component X representing the middle picture element P22 with, for example, the formulas $$y1 = -\frac{2}{20} x11 + \frac{3}{20} x12 + \frac{9}{20} x13 +$$

$$\frac{9}{20} x14 + \frac{3}{20} x15 - \frac{2}{20} x16$$

$$y2 = -\frac{2}{20} x21 + \frac{3}{20} x22 + \frac{9}{20} x23 +$$

$$\frac{9}{20} x24 + \frac{3}{20} x25 - \frac{2}{20} x26$$

$$y3 = -\frac{2}{20} x31 + \frac{3}{20} x32 + \frac{9}{20} x33 +$$

$$\frac{9}{20} x34 + \frac{3}{20} x35 - \frac{2}{20} x36$$

-continued
$$y4 = -\frac{2}{20} x41 + \frac{3}{20} x42 + \frac{9}{20} x43 +$$

$$\frac{9}{20} x44 + \frac{3}{20} x45 - \frac{2}{20} x46$$

$$y5 = -\frac{2}{20} x51 + \frac{3}{20} x52 + \frac{9}{20} x53 +$$

$$\frac{9}{20} x54 + \frac{3}{20} x55 - \frac{2}{20} x56$$

$$y6 = -\frac{2}{20} x61 + \frac{3}{20} x62 + \frac{9}{20} x63 +$$

$$\frac{9}{20} x64 + \frac{3}{20} x65 - \frac{2}{20} x66$$

$$X = -\frac{2}{20} y1 + \frac{3}{20} y2 + \frac{9}{20} y3 +$$

$$\frac{9}{20} y4 + \frac{3}{20} y5 - \frac{2}{20} y6$$

As shown in FIG. 1, an address generating device 24 generates addresses of the picture elements from an X clock signal, Cx, and a Y clock signal, Cy, which are respectively synchronized with the main scanning and the sub-scanning of the laser beam 13. During the aforesaid filtering processing, image signal components, which are first generated, are stored in a line memory 25 in association with the addresses. When subsequent image signal components corresponding to the addresses are then fed into the digital filter 22, calculations are made on corresponding image signal components.

Specifically, additions are carried out on image signal components y11, y12, y13, . . . , y1m, which are obtained from image signal components generated during a main scanning step and are stored in the line memory 25, and image signal components y21, y22, y23, . . . , y2m, which are obtained from image signal components generated during the next main scanning step. From the additions, added image signal components y11+y21, y12+y22, y13+y23, . . . , y1m+y2m are obtained. These added image signal components are stored in the line memory 25. Thereafter, additions are carried out on the added image signal components, which are read from the line memory 25, and image signal components, which are obtained from those generated during the subsequent main scanning step. The image signal components resulting from the additions are then stored in the line 25. These operations are repeated sequentially.

Alternatively, added image signal components, which are obtained from image signal components generated during six main scanning steps and which are expressed as (y11, y12, y13 ... y1m)
(y21, y22, y23 ... y2m)
(y31, y32, y33 ... y3m)

.

(y61, y62, y63 ... y6m)

may be stored in the line memory 25. After the six main scanning steps have been finished, additions may be carried out on the added image signal components.

In lieu of the line memory 25, a frame memory may be employed which is capable of storing the image signal components corresponding to the whole area of the stimulable phosphor sheet 10. However, calculations should preferably be carried out in the manner described above each time a single main scanning step is finished. In such cases, it is sufficient that a line memory be employed, which has a small storage capacity, for example, the capacity of storing only the image signal components corresponding to a single main scanning line or two main scanning lines.

Image signal components Xp, which have been generated for the respective picture elements in the manner described above, are sequentially stored in a large-capacity memory 26, which may be provided with an optical disk, a magnetic disk, or the like. In this manner, an image signal, which is made up of a series of image signal components Xp and corresponds to the whole area of the stimulable phosphor sheet 10, is stored in the large-capacity memory 26.

When the radiation image, which was stored on the stimulable phosphor sheet 10, is to be reproduced as a visible image, the image signal, which is made up of a series of image signal components Xp, is read from the large-capacity memory 26 and fed into an image processing unit 27 and then into an image reproducing apparatus 28, which may be constituted of a CRT display device, a light beam scanning and recording apparatus, or the like. With the image reproducing apparatus 28, the radiation image, which was stored on the stimulable phosphor sheet 10, is reproduced as a visible image.

With the embodiment described above, each picture element P is scanned with the laser beam 13, which serves as stimulating rays, by a plurality of scanning steps such that the position, which is scanned, is shifted for different scanning steps. Therefore, the total amount of light emitted per picture element in the radiation image stored on the stimulable phosphor sheet 10 can be kept sufficiently large. Accordingly, each image signal component Xp obtained from the filtering processing described above has a high level in accordance with the total amount of light emitted per picture element. When the image signal, which is made up of a series of image signal components Xp having high levels, is used, a visible image having good image quality and a high S/N ratio can be reproduced with the image reproducing apparatus 28.

Also, because the beam diameter of the laser beam 13 is adjusted such that it is larger than the size of each picture element P, the efficiency, with which the laser beam 13 is utilized, can be kept high.

Additionally, in the embodiment described above, filtering processing is carried out on the digital image signal Sd, which has been converted from the analog image signal S. Therefore, the level of quantization noise, which occurs with the final image signal components Xp, can be kept low. Accordingly, in cases where quantization noise is to be ultimately kept lower than a predetermined level, the number of quantization bits in the A/D converter 21 can be set to be smaller when a plurality of scanning steps are carried out per picture element and filtering processing is carried out than when only a single scanning step is carried out per picture element and filtering processing is not carried out.

In the aforesaid embodiment, two main scanning steps are carried out with the stimulating ray beam per picture element. However, the number of main scanning steps carried out per picture element is not limited to two and may be larger than two.

Figure 5:
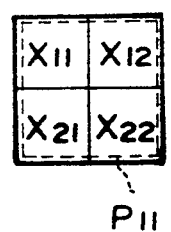
FIG. 5 is an explanatory view showing another example of how filtering processing is carried out on image signal components in the radiation image read-out apparatus in accordance with the present invention.
Figure 4:
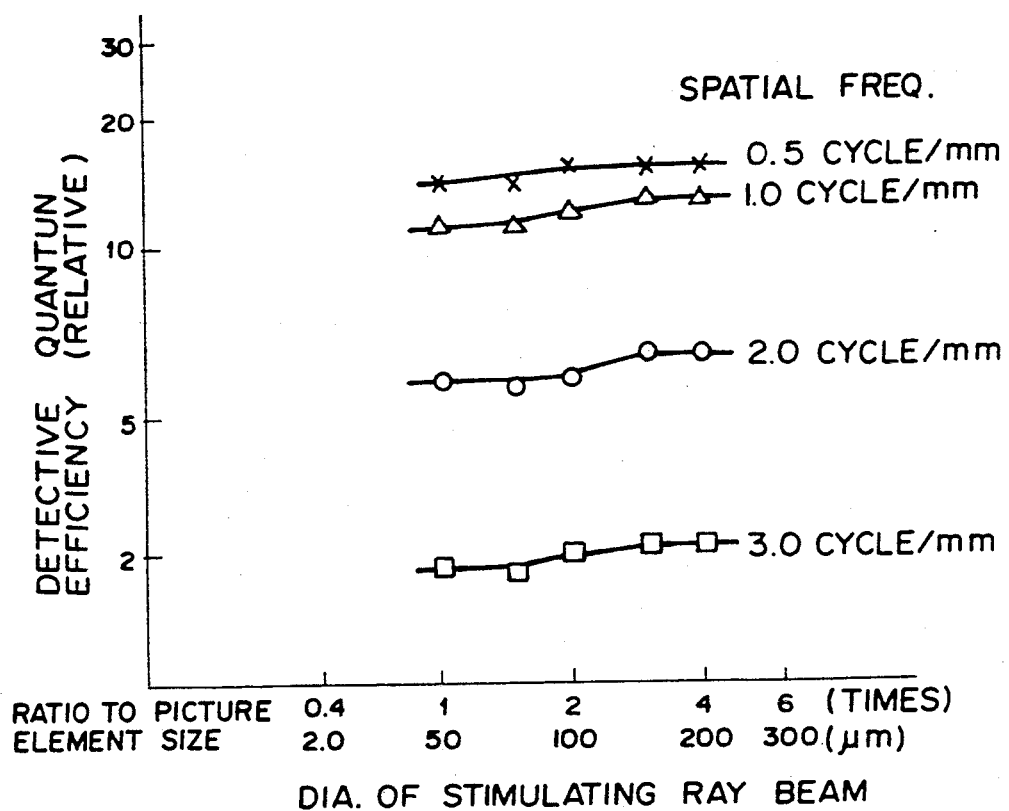
FIG. 4 is a graph showing the relationship between the ratio of the beam diameter of a stimulating ray beam to the size of each picture element and the relative value of the detective quantum efficiency (DQE) of a radiation image read-out apparatus.

Filtering processing may be carried out in any of other ways. For example, as shown in FIG. 5, from the values of four digital image signal components x11, x12, x21, and x22 corresponding to a picture element P11, the value of a final image signal component X representing the picture element P11 may be calculated from simple addition processing. The addition processing is expressed as $$y1 = \frac{1}{2} x11 + \frac{1}{2} x12$$

$$y2 = \frac{1}{2} x21 + \frac{1}{2} x22$$

$$X = \frac{1}{2} y1 + \frac{1}{2} y2$$

Figure 6:
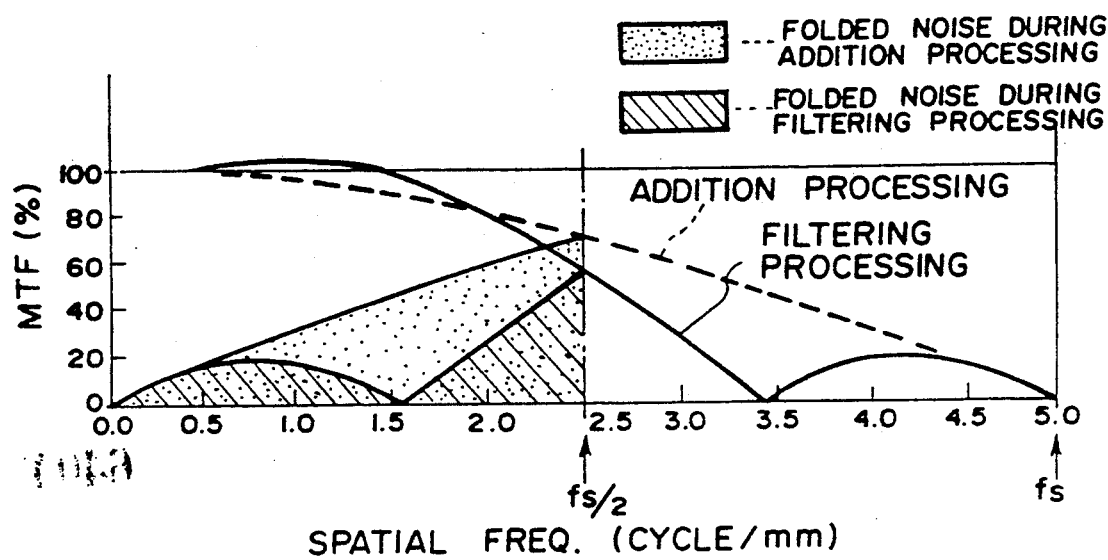
FIG. 6 is a graph showing the modulation transfer function (MTF) of filtering processing carried out in the radiation image read-out apparatus in accordance with the present invention.

FIG. 6 is a graph showing the modulation transfer function (MTF) of filtering processing, which is described above with reference to FIG. 3, and the MTF of the simple addition processing which is described above with reference to FIG. 5. (Though the simple addition processing is one type of filtering processing, it is thus referred to in order to be discriminated from the filtering processing, which is described above with reference to FIG. 3.) As illustrated in FIG. 6, folded noise, which occurs during the A/D conversion of the image signal S, is less perceptible when the filtering processing is carried out that when the simple addition processing is carried out.

Figure 7:
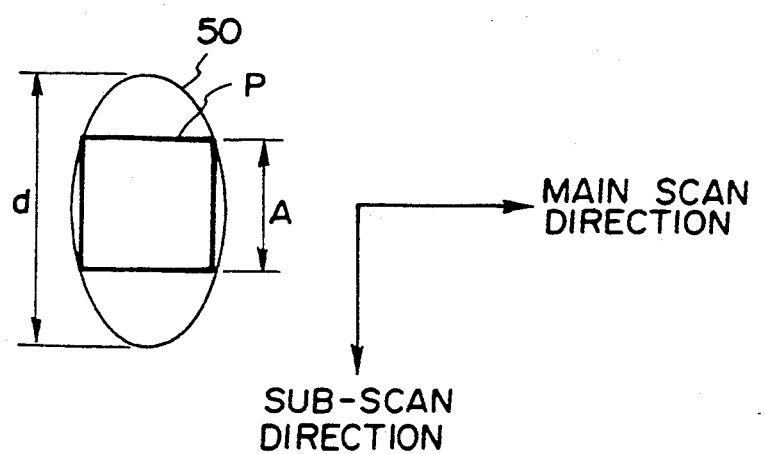
FIGS. 7 and 8 are schematic views showing examples of cross-sectional shapes of stimulating ray beams which may be employed in the radiation image read-out apparatus in accordance with the present invention.

When the size of each picture element is equal to $A \times A$, the beam diameter, d, of the stimulating ray beam should preferably fall within the range of $A < d \leq 2.5A$. The cross-sectional shape of the stimulating ray beam need not necessarily be circular. For example, as shown in FIG. 7, the stimulating ray beam may have an elliptic cross-sectional shape whose longer axis extends along the sub-scanning direction. In cases where the light beam 50 longer axis of the light beam 50 should preferably fall within the range of $A < d \leq 2.5A$.

Figure 8:
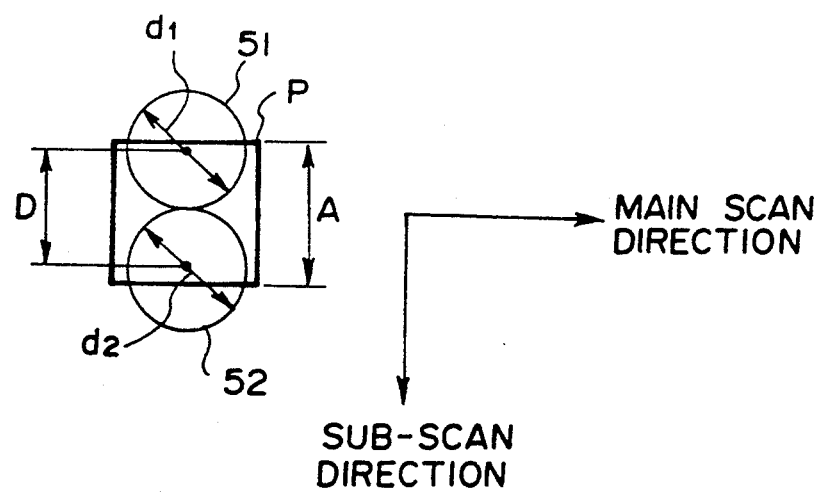

Also, at least two light beams may be combined, and the combined light beams may be utilized as the stimulating ray beam. For example, as shown in FIG. 8, light beams 51 and 52, which have circular cross-sectional shapes having diameters d1 and d2, may be combined, and the combined light beams may be utilized as the stimulating ray beam. The diameter, d, of the combined light beams is calculated with the formula $$d = D + (d1 + d2)/2$$

where D represents the distance between the center points of the light beams 51 and 52. In such cases, the diameter, d, of the combined light beams should preferably fall within the range of $A < d \leq 2.5A$.

I claim:

1. A radiation image read-out apparatus for scanning a stimulable phosphor sheet, on which a radiation image has been stored, with a stimulating ray beam, which causes the stimulable phosphor sheet to emit light in proportion to the amount of energy stored -thereon during its exposure to radiation, and photoelectrically detecting the light, which is emitted by part of the stimulable phosphor sheet being scanned with the stimulating ray beam, with a photodetector, an image signal being thereby generated, wherein the beam diameter of said stimulating ray beam is adjusted such that it is larger than the size of each picture element in said radiation image, each picture element is scanned with the adjusted stimulating ray beam by a plurality of scanning steps such that the position, which is scanned, is shifted for different scanning steps, and a filtering means is provided, with which a single image signal component representing each picture element is generated from a plurality of image signal components, which are obtained during the plurality of said scanning steps for each said picture element.

2. An apparatus as defined in claim 1 wherein, when the size of each picture element is equal to $A \times A$, the beam diameter, d, of the stimulating ray beam falls within the range of $A < d \leq 2.5A$.

3. An apparatus as defined in claim 1 wherein, when the stimulating ray beam has an elliptic cross-sectional shape whose longer axis extends along the sub-scanning direction and the size of each picture element is equal to $A \times A$, the length, d, of the longer axis of said stimulating ray beam falls within the range of $A < d \leq 2.5A$.

4. An apparatus as defined in claim 1 wherein, when two light beams, which have circular cross-sectional shapes having diameters d1 and d2, are combined, the combined light beams is utilized as the stimulating ray beam, and the size of each picture element is equal to $A \times A$, the diameter, d, of the combined light beams, which is calculated with the formula $$d = D + (d1 + d2)/2$$

where D represents the distance between center points of the light beams, falls within the range of $A < d \leq 2.5A$.

5. An apparatus as defined in claim 1 wherein the stimulating ray beam is a laser beam.

* * * * *